J. DARBY.
INTERMITTENT DRIVE AND FRAMING DEVICE FOR MOTION PICTURE MACHINES.
APPLICATION FILED MAR. 19, 1919.
1,398,128.
Patented Nov. 22, 1921.
2 SHEETS—SHEET 2.
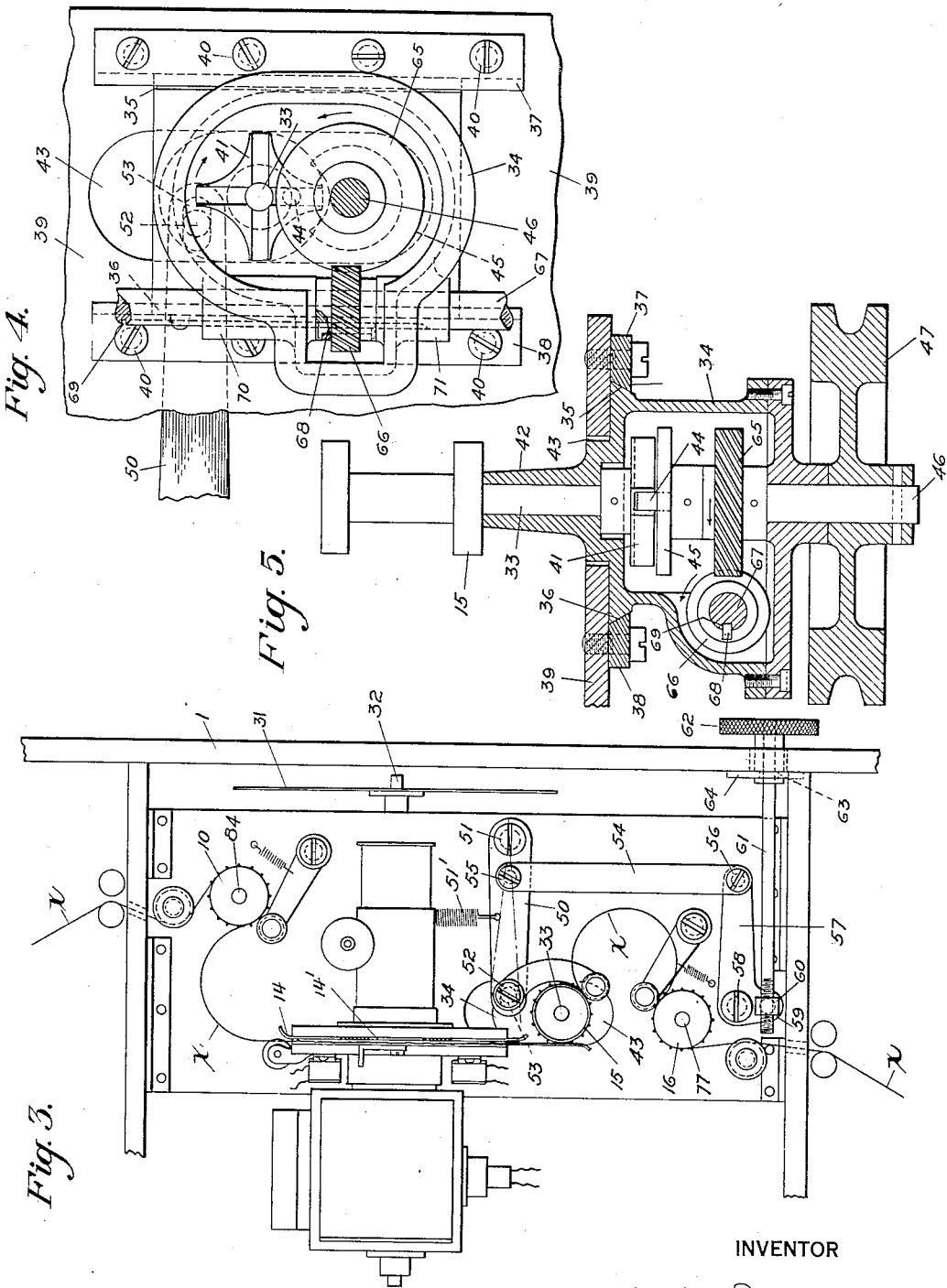
INVENTOR
John Darby

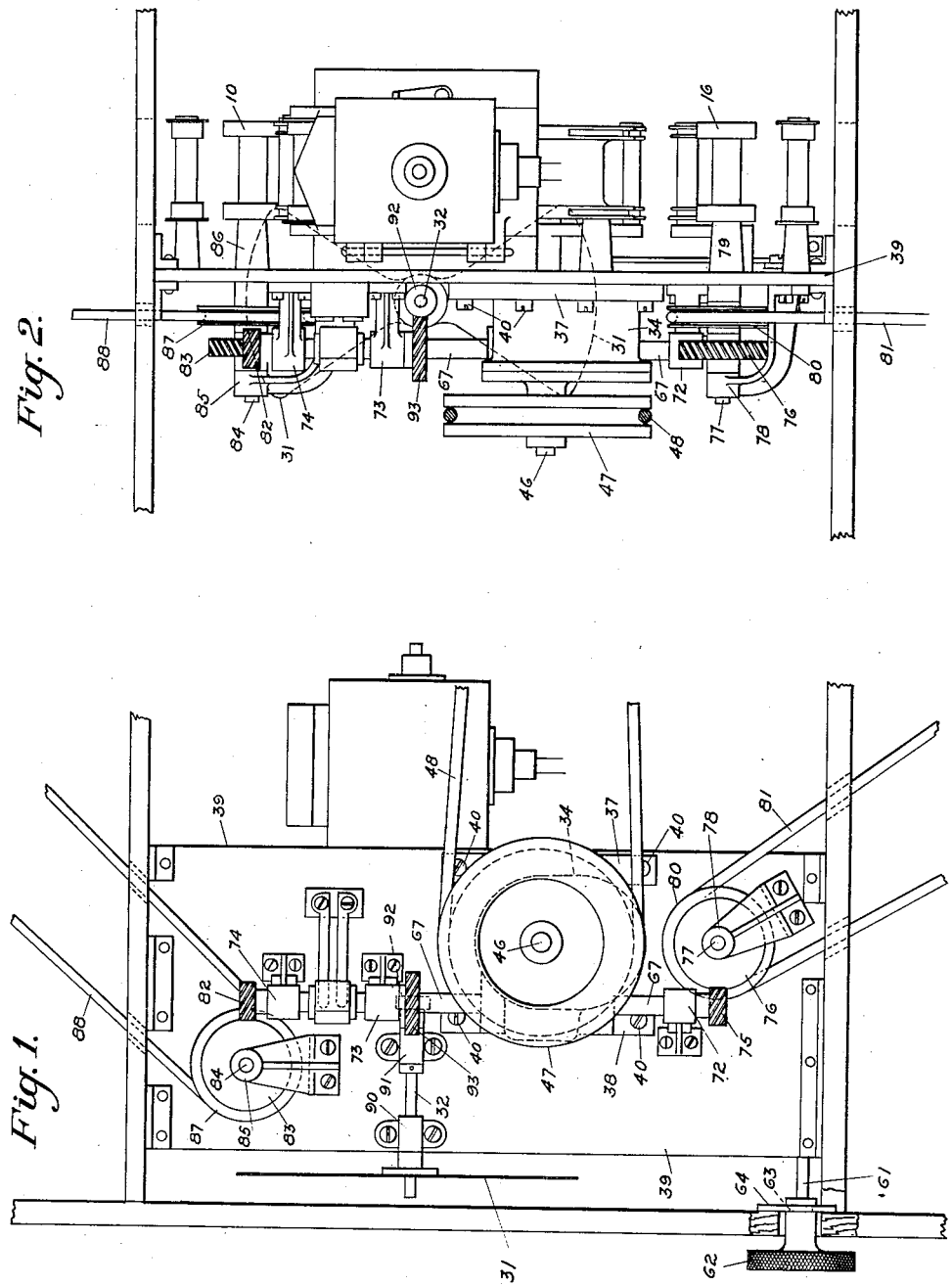

UNITED STATES PATENT OFFICE.

JOHN DARBY, OF SUMMIT, NEW JERSEY, ASSIGNOR OF ONE-HALF TO EDWIN F. FLINDELL, OF SUMMIT, NEW JERSEY.

INTERMITTENT DRIVE AND FRAMING DEVICE FOR MOTION-PICTURE MACHINES.

1,398,128.  Specification of Letters Patent.  Patented Nov. 22, 1921.

Original application filed March 1, 1918, Serial No. 219,752. Divided and this application filed March 19, 1919. Serial No. 283,558.

*To all whom it may concern:*

Be it known that I, JOHN DARBY, a citizen of the United States, residing at Summit, in the county of Union and State of New Jersey, have invented certain new and useful Improvements in Intermittent Drive and Framing Devices for Motion-Picture Machines, of which the following is a specification.

The invention relates to motion picture machines, and more especially to the means for framing a picture of the film strip in the aperture of the aperture plate and the means for carrying and driving the intermittent movement.

The objects of the invention are to provide a geared drive for the intermittent movement, the gears of which will always remain in true pitch relation and yet permit of linear movement of the intermittent sprocket to bring a picture of the film strip into frame with the aperture, to provide means for moving the intermittent movement vertically while in operation and automatically locking same in any position and means for deadening the noise of the intermittent movement.

These and other objects and advantages will be set forth in part hereinafter, and in part will be obvious herefrom, such objects and advantages being obtained by the instrumentalities pointed out in the accompanying claims.

The invention consists in the novel parts, constructions, arrangements, combinations and improvements herein shown and described.

This case is a division of my co-pending application, Serial No. 219,752, filed March 1, 1918.

Of the drawings:

Figure 1 is an elevation of a motion picture machine as viewed from the driving side.

Fig. 2. is an elevation of Fig. 1 as seen from the right.

Fig. 3. is an elevation of the machine showing the film feeding and intermittent sprockets and the means for moving vertically the intermittent movement and the self-locking means.

Fig. 4 is an elevation of the intermittent movement in its housing with cover plate removed, showing the driving means for the vertical shaft and a part of the framing means.

Fig. 5. is a sectional view of Fig. 4, showing the driving means for the intermittent sprocket and the vertical shaft.

Referring particularly to Figs. 3, 4 and 5, the intermittent movement for the sprocket 15 on shaft 33, is comprised in the well known star, cam and pin movement mounted in an inclosed case 34 adapted to move in the direction of travel of the film strip X. Case 34 is provided with suitable guides 35, 36 engaging gibs 37 and 38 secured to the machine frame 39 by screws 40, 40. Shaft 33 carrying intermittent sprocket 15 and star 41, is supported in a suitable bearing 42 of the movable case 34 and an opening 43 is provided in frame 39 to admit of the movement of said bearing. Pin 44 carried by the disk and cam 45 mounted on driving shaft 46 rotatively supported in suitable bearings in case 34, transmits intermittently movement to the star 41 in the well known manner.

Fixed to shaft 46 outside the case 34, is the combined fly wheel and pulley 47, driven by the flexible belt 48 from any suitable source of power, such as a motor, not shown.

Means for imparting movement to the case 34 and with it the intermittent sprocket 15, in the direction of travel of the film X, in order to frame a picture in the aperture of aperture plate 14 are provided, and as embodied and shown in Figs. 3 and 4, consist of a lever 50 pivoted at one end to the frame member 39 at 51 and at its opposite end flexibly connected to the case 34 by the pin 52 engaging the slot 53 in said lever 50. A link 54 pivoted at its upper end 55 to lever 50 is also pivotally connected at its lower end 56 to one arm of a bell crank lever 57, said lever being pivoted to the frame member 39 at 58. The other arm 59 of lever 57 extends downwardly and carries a pivotally mounted block or nut 60, which engages a thread on the rod 61, the other end of said rod having pinned or otherwise secured to it a knurled head 62, provided on its shank with a groove 63 engaging the plate 64 fixed to the casing 1. A tension spring 51' may be utilized to counterbalance the weight of all moving parts and to take up lost motion in the link and lever connections.

It will be obvious, that by a comparitively small rotative movement of the head 62 in either direction, a considerable movement, due to the multiplication of leverages, will be imparted to the case 34 and through it to the intermittent sprocket 15 and the film X in line with its path of travel past the aperture plate 14, and that a picture may readily be brought to register in the aperture 14' of said aperture plate 14. This movement will also be self locking.

It will be understood that as there are no gears interposed between the driving means and the intermittent sprocket, there will be no lost motion and consequently the wear on the moving parts will be reduced to a minimum.

Suitable means are provided to drive the continuously moving sprockets 10 and 16, the feed and take-up reels, not shown, and the interrupting shutter 31; and as embodied are comprised of the helical gear 65 secured to the shaft 46, said gear meshing with helical gear 66 slidably mounted on, but fixed to rotate with shaft 67, by means of a key 68 fixed in said gear 66 and sliding in the key way 69 provided in said shaft 67.

Shaft 67 is adapted to rotate in bearings 70 and 71 provided in the movable case 34. The inner faces of said bearings engaging the upper and lower faces of the hub of gear 66, serve to maintain said gear in true pitch relation with its driving gear 65 while admitting of a vertical sliding movement of said gear along shaft 67 as case 34 is moved vertically upward or downward in its supporting gibs 37 and 38.

It will be understood from the construction above described, that the case 34 carrying the intermittent movement may be freely moved up or down in its supports, and that the driven gear 66 will move with said case and along the shaft 67, always maintaining its driving relation to said shaft through the fixed key 68 in said gear sliding in keyway 69 of shaft 67, and that the gears 65 and 66 will always remain in true pitch relation with each other.

Shaft 67 extending below case 34 is supported in bearing 72, and above said case in bearings 73 and 74 all secured to frame member 39.

Mounted on the lower end of shaft 67 is a helical gear 75 engaging the helical gear 76 carried by shaft 77 supported in bearings 78 and 79 secured to frame member 39. Said shaft has fixed to it, at its inner end, the continuously rotating sprocket roller 16.

Adjacent to gear 76 on shaft 77, a pulley 80 drives by a flexible belt 81 a take-up film reel, not shown.

Through a similar train of gears 82 and 83 at the upper end of shaft 67, a shaft 84 carried by bearings 85 and 86 drives the continuously rotating sprocket roller 10, and through the pulley 87 and belt 88, under certain conditions, drives a film reel which is not shown.

Rotative movement of the shutter 31 on shaft 32, carried in bearings 90 and 91, in proper time relation with the intermittent movement of film X, is imparted through the helical gear 92 on shaft 32 engaging the helical driving gear 93 on shaft 67.

It will be evident from the construction disclosed, that means have been provided to rapidly frame a picture of the film strip by a movement of the whole intermittent sprocket mechanism, in alinement with the path of travel of the film and at the same time maintaining true pitch relation between all coacting driving and driven gears.

It will be further understood, that many changes may be made from the exact form of such means as are herein shown and described, within the accompanying claims, without departing from the principles of the invention and without sacrificing its objects and advantages,

I claim:

1. In a motion picture projecting machine using a film strip, continuously moving sprockets for said strip, an intermittently moving sprocket for said strip, a movement for said intermittent sprocket, a housing supporting said intermittently moving sprocket and completely inclosing said movement, and a vertical shaft passing through said housing to drive said continuously moving sprockets.

2. In a motion picture projecting machine using a film strip, continuously moving sprockets for said strip, an intermittently moving sprocket for said strip, a movement for said intermittent sprocket, a housing supporting said intermittently moving sprocket and completely inclosing said movement and means passing through and driven within said housing to drive said continuously moving sprockets.

3. In a motion picture projecting machine using a film strip, continuously moving sprockets for said strip, an intermittently moving sprocket for said strip, a movement for said intermittent sprocket, an adjustable housing supporting said intermittently moving sprocket and completely inclosing said movement, a vertical shaft passing through said housing to drive said continuously moving sprockets and means for adjusting said housing.

4. In a motion picture projecting machine using a film strip, continuously moving sprockets for said strip, an intermittently moving sprocket for said strip, a movement for said intermittently moving sprocket, an adjustable housing supporting said intermittently moving sprocket and completely inclosing said movement, a splined shaft passing through said housing and driving said continuously moving sprockets, a gear slidable on and rotatable with said shaft and driven within said housing and means for adjusting said housing.

5. In a motion picture projecting machine using a film strip, an intermittently moving sprocket for said strip, a movement for said sprocket, an adjustable housing supporting said sprocket and inclosing said movement, a rotating shutter, driving means for said shutter passing through and driven within said housing and means for adjusting said housing.

6. In a motion picture projecting machine using a film strip, continuously moving sprockets for said strip, an intermittently moving sprocket for said strip, a movement for said intermittently moving sprocket, an adjustable housing supporting said intermittently moving sprocket and inclosing said movement, a rotating shutter and driving means for said continuously moving sprockets and said shutter passing through said housing and means for adjusting said housing.

7. In a motion picture projecting machine using a film strip, continuously moving sprockets for said strip, an intermittently moving sprocket for said strip, a movement for said intermittent sprocket, an adjustable housing supporting said intermittent sprocket and inclosing said movement, a rotating shutter and driving means for said continuously moving sprockets and said shutter passing through and driven within said housing and means for adjusting said housing.

8. In a motion picture projecting machine using a film strip, continuously moving sprockets for said strip, an intermittently moving sprocket for said strip, a movement for said intermittent sprocket, an adjustable housing supporting said intermittent sprocket and inclosing said movement, a rotating shutter, a splined shaft passing through said housing and driving said continuously moving sprockets and said shutter, a gear slidable on and rotatable with said shaft and driven within said housing and means for adjusting said housing.

9. In a motion picture projecting machine using a film strip, continuously moving sprockets for said strip, an intermittently moving sprocket for said strip, a movement for said intermittent sprocket, driving means for said movement, an adjustable housing supporting said intermittent sprocket and inclosing said movement, a splined shaft passing through said housing and driving said continuously moving sprockets, a gear slidable on and rotatable with said shaft, a gear on said movement driving said slidable gear and self locking adjusting means for moving said housing.

In testimony whereof, I have signed my name to this specification, in the presence of two subscribing witnesses.

JOHN DARBY.

Witnesses:
 CHARLES C. BRESEE,
 E. S. ECKARDT.